United States Patent
Wheeler

(10) Patent No.: US 6,957,620 B1
(45) Date of Patent: Oct. 25, 2005

(54) SELF-GENERATING AIR CUSHION VESSEL

(76) Inventor: Robert L. Wheeler, 823-A E. Gulf Blvd., Indian Rocks Beach, FL (US) 33785

( * ) Notice: Subject to any disclaimer, the term of this patent is extended or adjusted under 35 U.S.C. 154(b) by 0 days.

(21) Appl. No.: 10/905,370

(22) Filed: Dec. 30, 2004

(51) Int. Cl.⁷ .................................................. B63B 1/34
(52) U.S. Cl. ............................................... 114/67 A
(58) Field of Search .......................... 114/67 A, 67 R, 114/291

(56) References Cited

U.S. PATENT DOCUMENTS

| | | | | |
|---|---|---|---|---|
| 1,408,178 A | * | 2/1922 | Downing | 440/44 |
| 1,656,411 A | * | 1/1928 | Baldwin | 114/67 R |
| 1,784,071 A | * | 12/1930 | Norman | 114/289 |
| 1,824,313 A | * | 9/1931 | Vogler | 114/67 A |
| 1,831,697 A | * | 11/1931 | Ziegler | 114/67 A |
| 2,172,674 A | * | 9/1939 | Frost | 114/288 |
| 2,450,665 A | * | 10/1948 | Jutte | 440/38 |
| 3,518,956 A | | 7/1970 | Girodin | |
| 3,662,700 A | * | 5/1972 | Roumejon | 114/67 A |
| 3,688,724 A | | 9/1972 | Bertin | |
| 3,742,888 A | | 7/1973 | Crowley | |
| 6,250,246 B1 | * | 6/2001 | Hubley | 114/288 |

* cited by examiner

*Primary Examiner*—Ed Swinehart
(74) *Attorney, Agent, or Firm*—Ronald E. Smith; Smith & Hopen, P.A.

(57) ABSTRACT

A drag-reducing air chamber is formed under a watercraft when the watercraft is underway. Air enters into the air chamber when the watercraft is moving forward. Supplemental air is introduced into the air chamber by an air scoop mounted to the bow in a first embodiment and in side-mounted air scoops in another embodiment. A one-way valve in an air passageway between the air scoop and the air chamber prevents air from flowing from the air chamber to the air scoop. A pair of elongate rails depends from opposite sides of the hull and defines the sides of the air chamber. Shorter rails may be used in high-speed applications where the bow of the watercraft is lifted from the water.

3 Claims, 9 Drawing Sheets

SELF-GENERATING AIR CUSHION VESSEL

BACKGROUND OF THE INVENTION

1. Field of the Invention

This invention relates, generally, to watercraft. More particularly, it relates to a watercraft design that directs an airflow under the hull to reduce drag.

2. Description of the Prior Art

A Carolina skiff is a small fishing boat having a pair of rails that extend substantially the entire length of the boat. A first rail depends from the port side of the hull and a second rail depends from the starboard side thereof. The rails help keep the watercraft traveling in a straight line when the watercraft is traveling at normal speeds.

If a Carolina skiff, or similar watercraft, is operated at high speeds, the bow lifts out of the water. Accordingly, the respective leading ends of the rails are also lifted from the water.

Thus there is a need for a Carolina skiff designed for high speed operation.

When a Carolina skiff, or similar watercraft, is operating at high speeds, it is subjected to considerable drag. This increases the fuel consumption rate of the motor.

There is a need, therefore, for a watercraft design that enables a watercraft like a Carolina skiff to travel at high rates of speed with a reduced drag and thus a reduced rate of fuel consumption vis a vis the Carolina skiff of the prior art.

Earlier inventions generally in this field of technology are disclosed in U.S. Pat. Nos. 3,742,888 and 3,688,724, 3,518,956, and Great Britain patent No. 1,001,059.

However, in view of the prior art considered as a whole at the time the present invention was made, it was not obvious to those of ordinary skill in the pertinent art how the known Carolina skiffs and similar watercrafts could be modified to further reduce drag and increase speed.

SUMMARY OF THE INVENTION

The long-standing but heretofore unfulfilled need for a Carolina skiff or similar watercraft having reduced drag so that it is capable of relatively high speed travel when under its own power and requiring reduced power to tow it is now met by a new, useful, and nonobvious invention.

The novel watercraft of this invention includes a bow, a stern, a deck and a hull. An air chamber defined at its top by the rigid hull, at its sides by the rails that depend from opposite sides of the hull, and at its bottom by the body of water that buoyantly supports the watercraft.

More particularly, the air chamber has a forward end near the bow and a rearward end somewhat forwardly of the stern so that air flows into the air chamber at the forward end and so that air flows out of the air chamber under the stern as the watercraft undergoes forward travel.

Air in the air chamber reduces the drag of the watercraft, thereby enabling the watercraft to travel faster under its own power and reducing the power required to drag a small watercraft behind a larger watercraft.

Air produces less drag than water. Accordingly, replacing water with low-density air reduces the wetted surface area of the hull and therefore reduces drag. However, unlike some earlier designs, the air in the air chamber does not form a relatively static bubble beneath the watercraft that expands and contracts in size as waves form troughs and crests, respectively. In contrast, air enters into and exits the air chamber at substantially the speed at which the watercraft is traveling.

When the watercraft is under way, air enters into the air chamber. Since air density is about one-eight hundredth (1/800th) the density of water, the drag developed by the watercraft is substantially reduced.

Significantly, the reduction in drag is beneficial when the watercraft is under tow as well. In some cases, the watercraft could ride in the wake of a larger, towing craft and the drag could be reduced to a very low value.

Thus it is understood that the primary reduction in drag is achieved by the air chamber formed by the hull of the watercraft and the side rails that depend from the hull on opposite sides of the watercraft.

At speeds above a certain threshold, such as fifteen (15) knots, the drag may be further reduced by the provision of an air scoop mounted to the bow.

In a preferred embodiment, the air scoop is made of fiberglass formed integrally with the fiberglass that forms the watercraft. The air scoop is adapted to collect air when the watercraft is undergoing forward travel and to direct air into the air chamber. The air scoop has a generally elliptical shape such that a transverse extent thereof is greater than a height extent thereof.

When the watercraft is undergoing forward travel, air enters into the air scoop and is directed into the air chamber. Air entering into the air chamber reduces the drag against forward travel as aforesaid. Air in the air chamber escapes the air chamber by flowing under the stern so that an airflow is established into and out of the air chamber as the watercraft undergoes forward travel.

A stern plate is positioned rearwardly of the air chamber and is tilted at a slight angle relative to horizontal with its leading edge a little higher than its trailing edge. Air exiting the air chamber thus is constrained to flow under the stern plate. This raises the stern of the watercraft slightly and further reduces drag.

An airflow passageway extends from a leading end of the air scoop into the air chamber. The airflow passageway may have a gradual reduction of volume as it approaches the air chamber or the airflow passageway may have a constant volume.

Air pressure in the air chamber is lower than atmospheric air pressure so that air is drawn or rammed into the air scoop when the watercraft is undergoing forward motion (whether under its own propulsion or due to towing).

A one-way valve is mounted in the airflow passageway to enable ram airflow into the air chamber when the watercraft is in forward motion and to prevent reverse direction airflow so that ram air flowing in the airflow passageway toward the air chamber cannot flow in an opposite direction.

Thus, air in the air chamber does not flow toward the air scoop when the bow of the watercraft is momentarily lifted from the water when the watercraft is traveling in choppy waters.

The one-way valve may be provided in many forms, all of which are within the scope of this invention.

In a preferred embodiment of the one-way valve, an impervious-to-air gate is hingedly mounted to an upper wall of the air passageway. The gate swings open about its hinges when ram air flows from the air scoop to the air chamber. The gate closes under its own weight when air attempts to flow from the air chamber toward the air scoop.

An important object of this invention is to provide a watercraft that travels substantially faster than a conventional watercraft when the power inputs are equal.

A more specific object is to provide a watercraft that travels faster than conventional watercraft due to a reduced drag design.

Another object is to provide a watercraft having reduced drag so that is easier to tow than a conventional watercraft.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
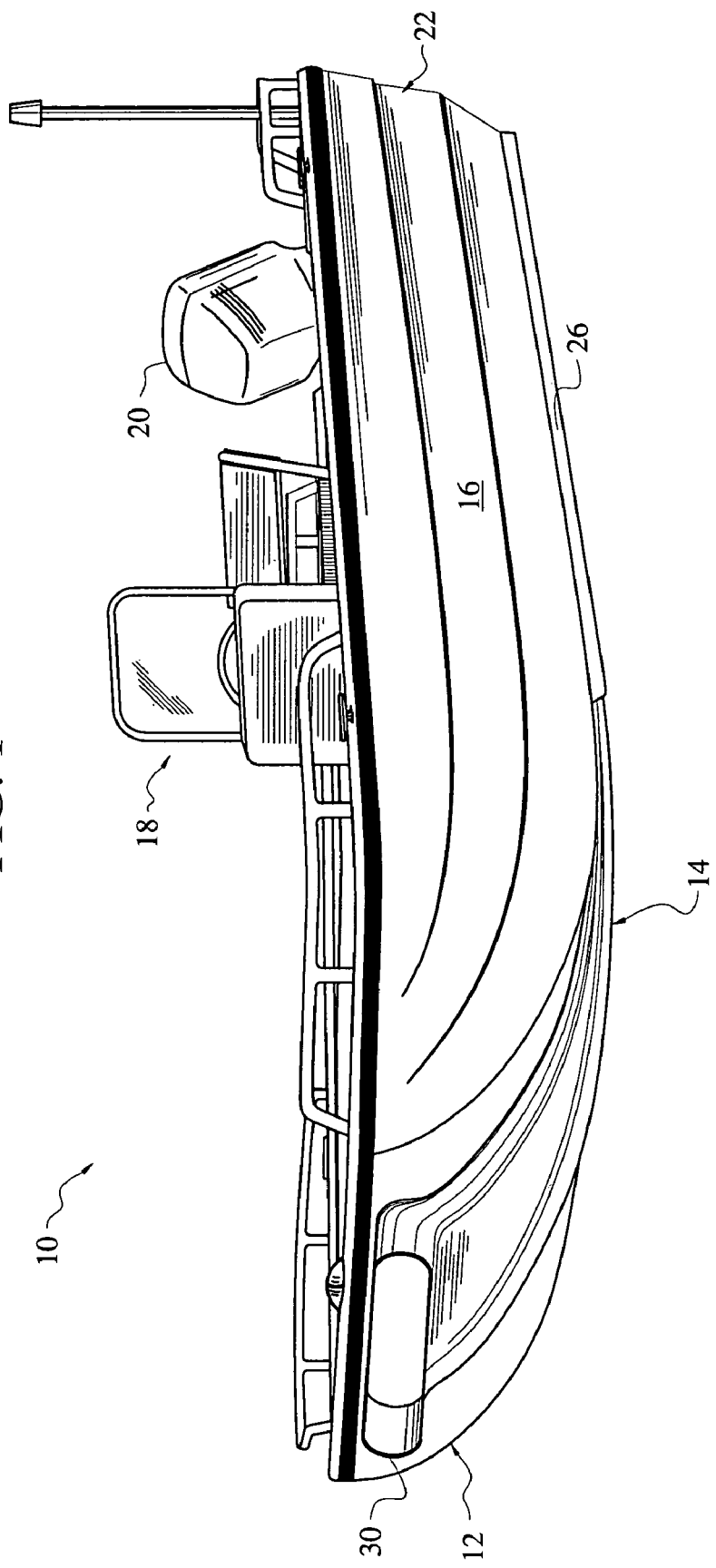
FIG. 1 is a front perspective view of the novel watercraft.
Figure 2:
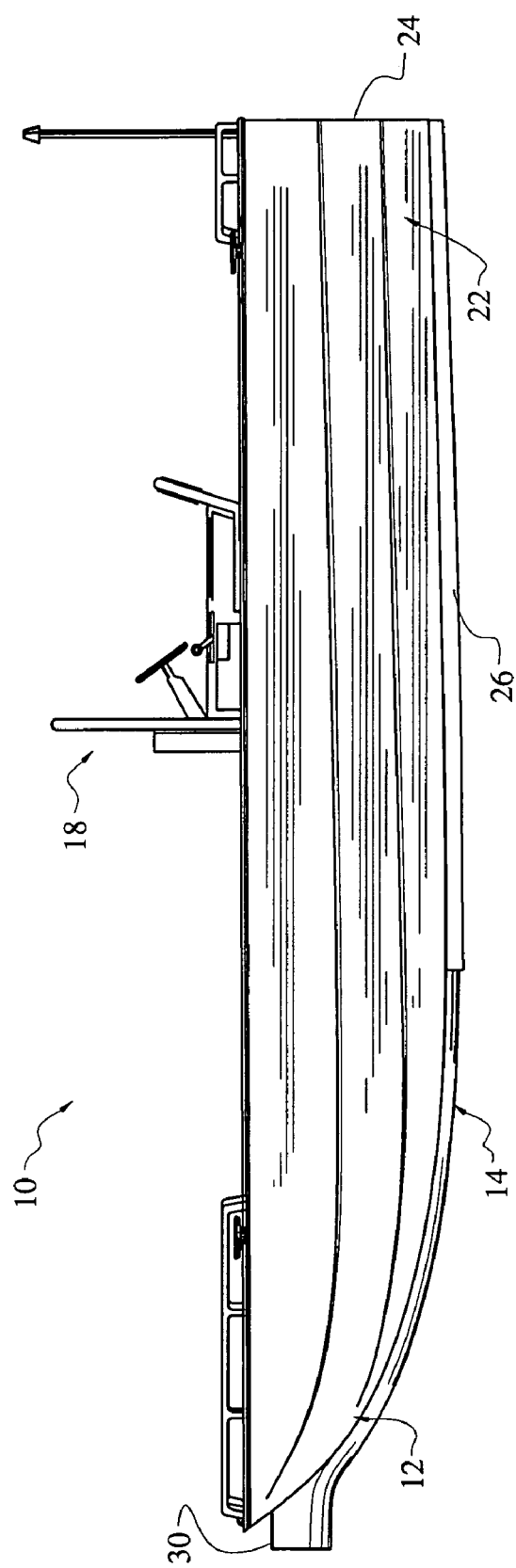
FIG. 2 is a side elevational view thereof.

Referring now to FIGS. 1 and 2, it will there be seen that the reference numeral 10 denotes a first embodiment of the novel watercraft as a whole. The invention will be described by making reference to a Carolina Skiff® watercraft for convenience purposes, but the teachings and suggestions of this disclosure are also applicable to other small craft such as yachts, RIBs (rigid inflatable boats), dinghies, rowboats, motorboats, surfboards, windsurfing boards, and the like. The teachings and suggestions of this invention are equally applicable to large craft.

Watercraft 10 includes bow 12, hull 14, first sidewall 16, a second sidewall that is not depicted, an operator's station 18, motor 20, stern 22, and transom 24.

A first elongate rail 26 depends from a first side of hull 14 and a second elongate rail 28 (FIGS. 5, 7 and 9) depends from a second side of said hull 14.

Air intake scoop 30 is formed integrally with bow 12. Air intake scoop 30 has a generally elliptical configuration so that its transverse extent exceeds its height extent.

Figure 3A:
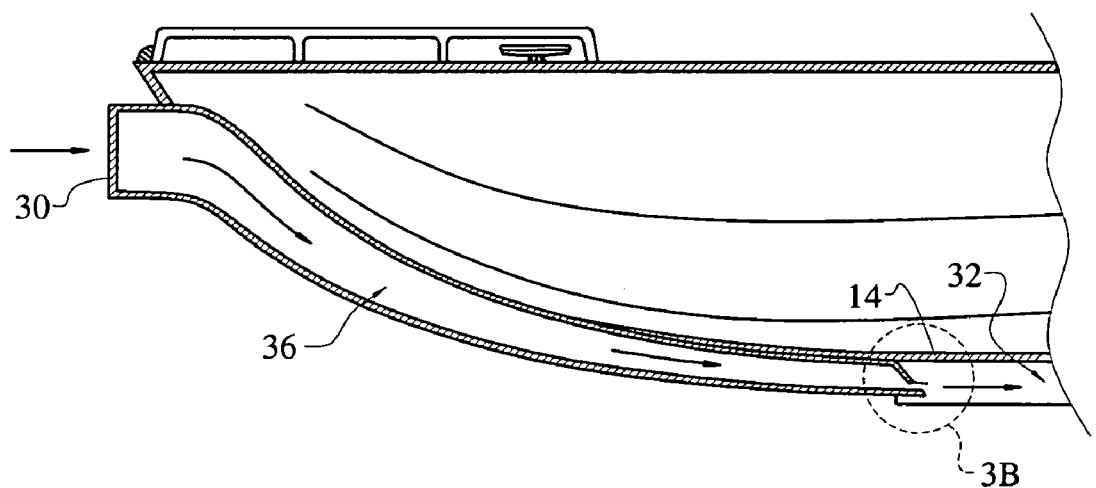
FIG. 3A is a side elevational view in longitudinal section of a forward half of the novel watercraft.
Figure 3B:
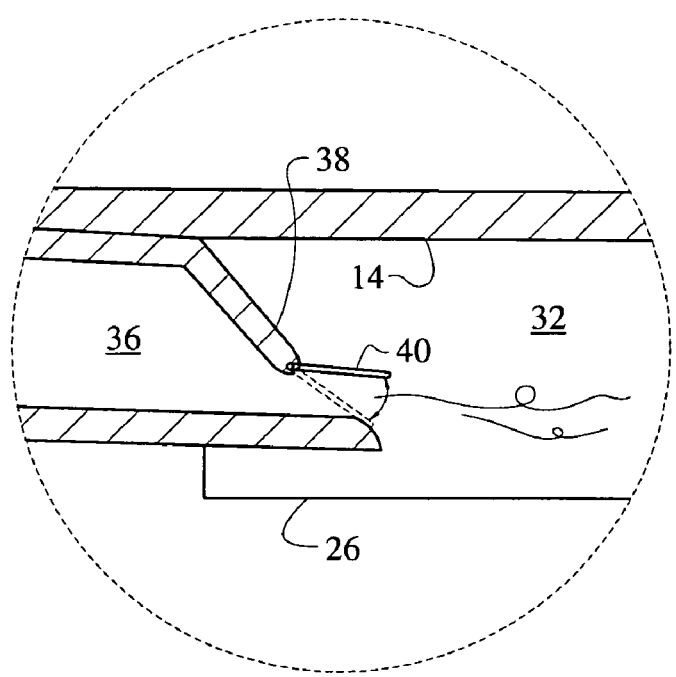
FIG. 3B is an exploded view of the circled part of FIG. 3A denoted 3B.

FIGS. 3A and 3B depict air chamber 32 having a top defined by hull 14 and sides defined by said elongate, parallel rails 26, 28.

The width of air intake scoop 30 is about the same as the width of air chamber 32, thereby ensuring that the volume of air entering into said air chamber per unit of time is a large volume.

It should be understood that air scoop 30 is not required to provide the reduced drag effects offered by air chamber 32. At relatively slow speeds, sufficient air enters into air chamber 32 to provide the drag reduction needed. At higher speeds, supplemental air from air scoop 30 becomes beneficial at maintaining the air in said air chamber.

Air scoop 30 includes an airflow passageway, denoted 36 generally in FIGS. 3A and 3B, that extends from the leading edge of air scoop 30 to the leading end of air chamber 32.

Figure 4:
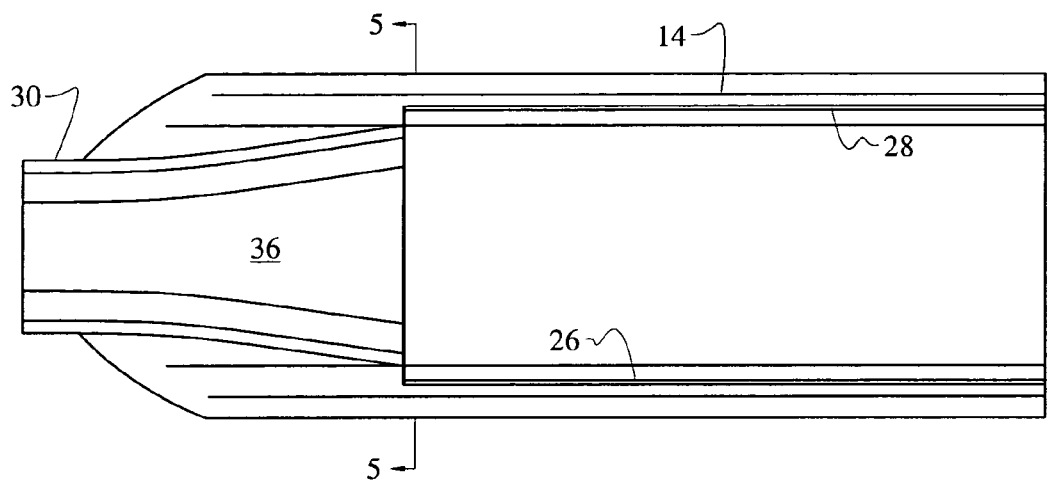
FIG. 4 is a bottom plan view of the novel watercraft.
Figure 5:
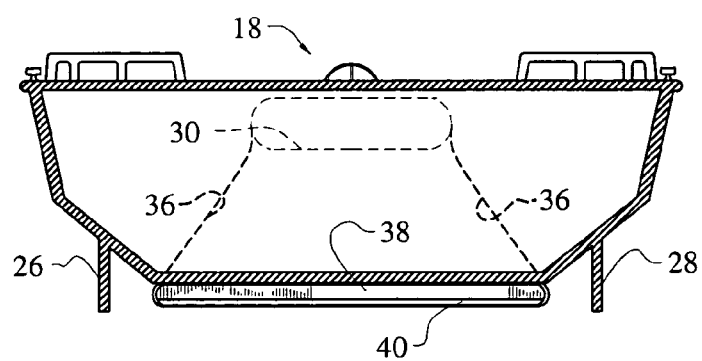
FIG. 5 is a sectional view taken along line 5—5 in FIG. 4.

As depicted in FIGS. 4 and 5, airflow passageway 36 maintains a constant width along its longitudinal extent from scoop 30 to air chamber 32. However, its vertical extent gradually decreases as it approaches air chamber 32 as best depicted in FIGS. 3A and 3B.

A more abrupt reduction in height is provided by downwardly extending constriction member 38 at the trailing end of air passageway 36.

Flap 40 is hingedly mounted to the trailing end of constriction member 38. Flap 40 has a position of repose depicted in dotted lines in FIG. 3B. When watercraft 10 is underway, air flowing into air passageway 36 lifts flap 40 to its fully open FIG. 3B solid line position 40. An amount of opening between the fully closed and fully open positions may also occur at some speeds.

The volume of air chamber 32 is greater then the volume of the constriction caused by constriction member 38. Thus, the air pressure within air chamber 32 is less than atmospheric pressure, thereby drawing ambient air into air scoop 30 as watercraft 10 travels forwardly.

Figure 6:
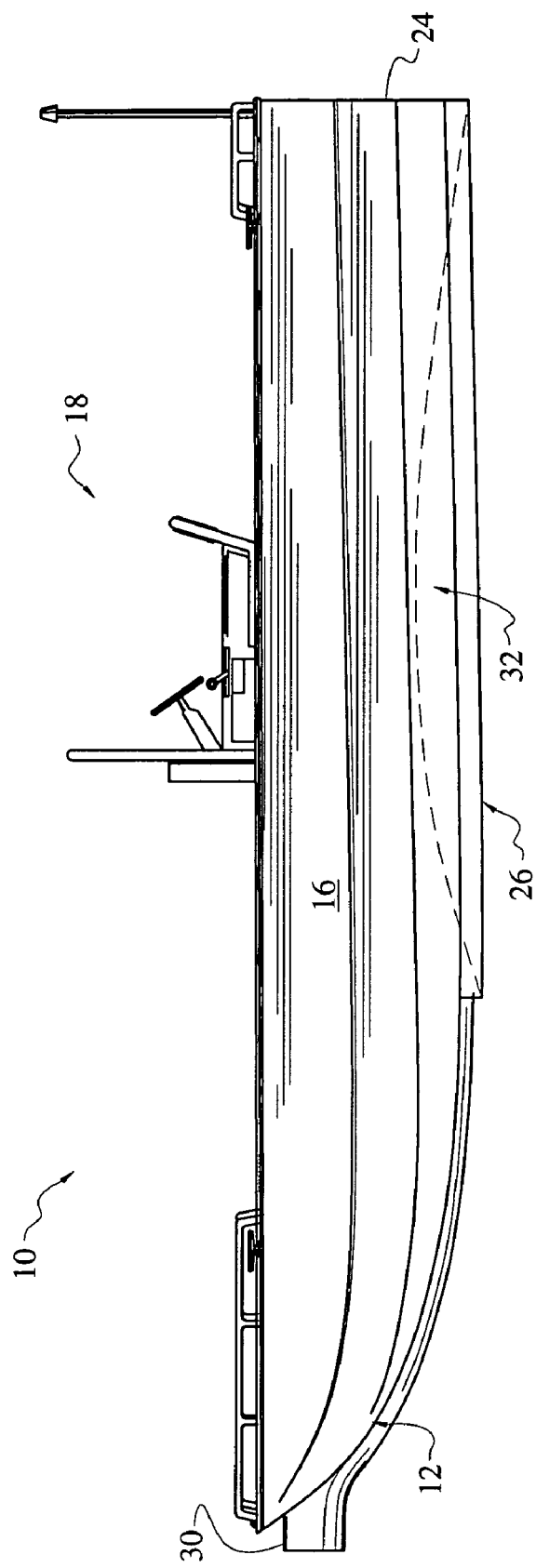
FIG. 6 is a side elevational view of a second embodiment.

FIG. 6 depicts a second embodiment where an air chamber 32 is formed in hull 14. Thus, this embodiment requires substantial modification of a Carolina Skiff.

Figure 7:
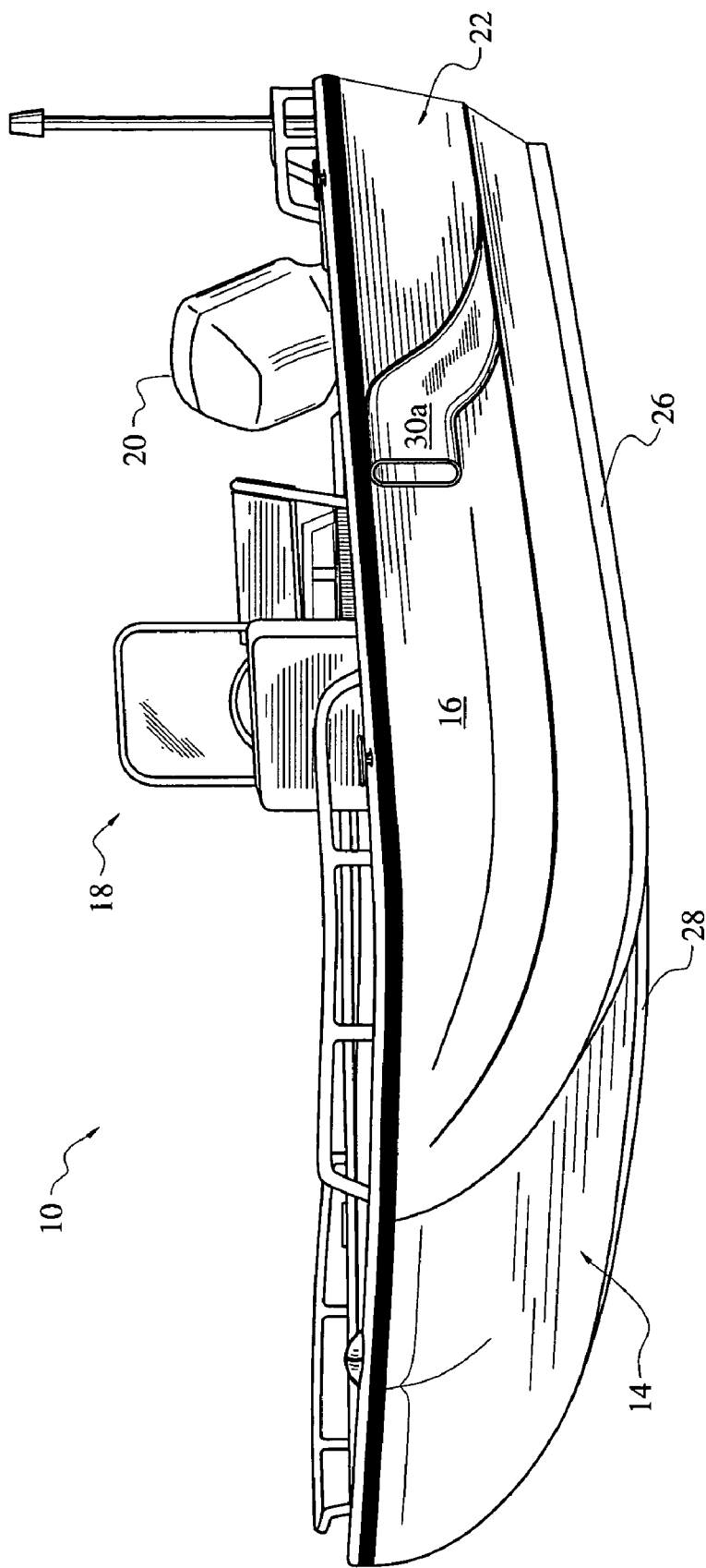
FIG. 7 is a front perspective view of a third embodiment.
Figure 8:
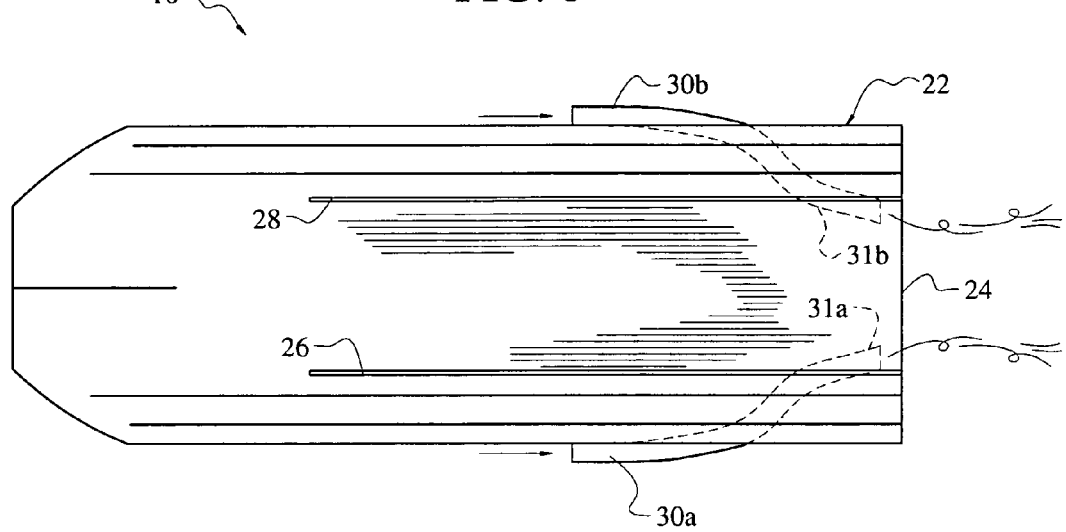
FIG. 8 is a bottom plan view of said third embodiment.
Figure 9:
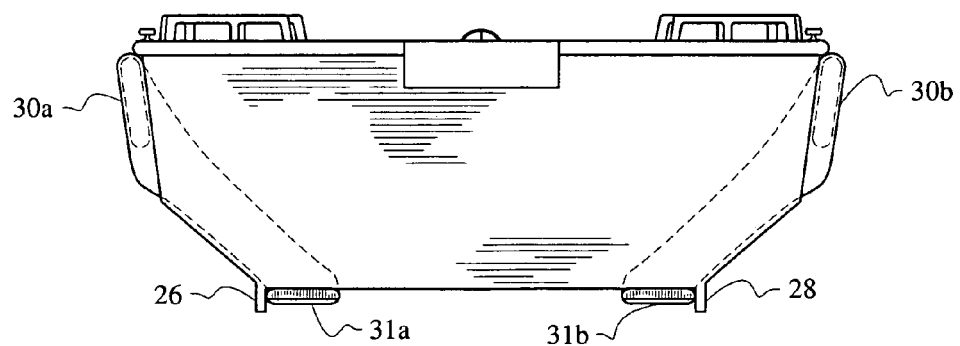
FIG. 9 is a rear elevational view of said third embodiment.

FIGS. 7–9 depict a third embodiment where air scoops having leading ends 30a, 30b and trailing ends 31a, 31b, respectively, are formed in the sides of the watercraft. The respective trailing ends 31a, 31b of said air scoops are positioned rearwardly of bow 14 and slightly forwardly of stern 22 of watercraft 10, between elongate rails 26, 28. This is due to the fact that at high speeds, the bow of the watercraft lifts from the water and only the stern area of the watercraft is in contact with the water. Accordingly, air from air scoops 30a and 30b is introduced into the stern end of air chamber 32. Such air is constrained to flow out from under the stern end of the watercraft because rails 26, 28 prevent lateral flow thereof.

It should be noted that rails 26, 28 need not extend very far forwardly of stern 22 in watercraft intended for high speed travel.

A constriction member such as constriction member 38 of the first embodiment, together with flap 40, may be provided at the respective trailing ends 31a, 31b of air scoops 30a, 30b to prevent reverse airflow as in the first embodiment.

A dinghy 10a equipped with the novel air chamber is depicted in FIGS. 10–13. Rails 26, 28 are added to the hull of the dinghy to frame the longitudinally-extending sides of air chamber 32. The construction of air chamber 32 is disclosed in co-pending U.S. patent application filed Dec. 23, 2003, bearing Ser. No. 10/707,590, and having the same title as the present disclosure, which disclosure is incorporated herein by reference.

Figure 10:
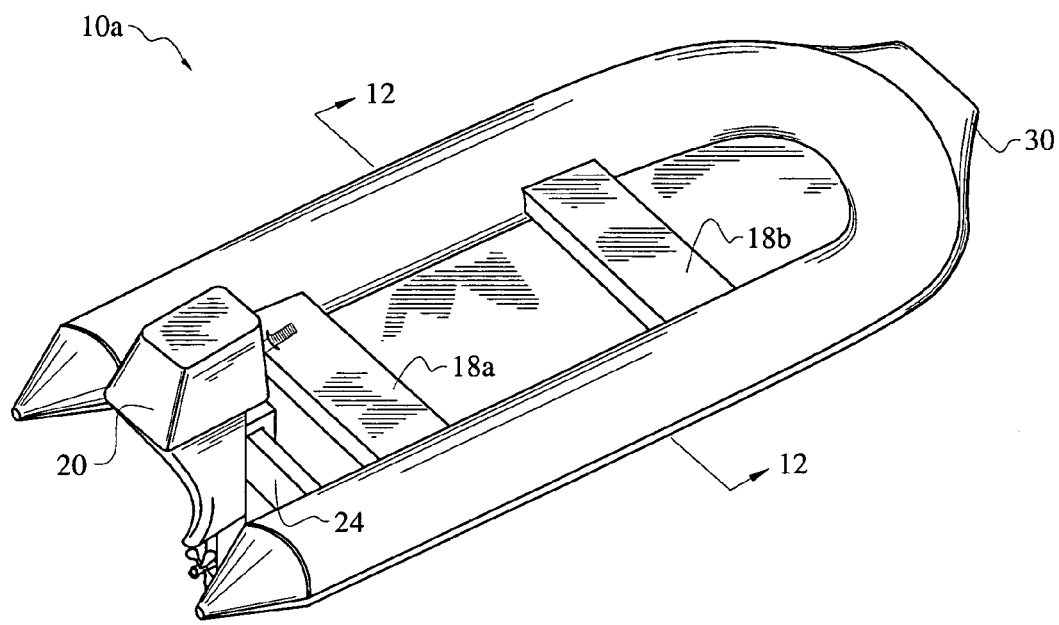
FIG. 10 is a rear perspective view of a dinghy that incorporates the inventive parts.
Figure 11:
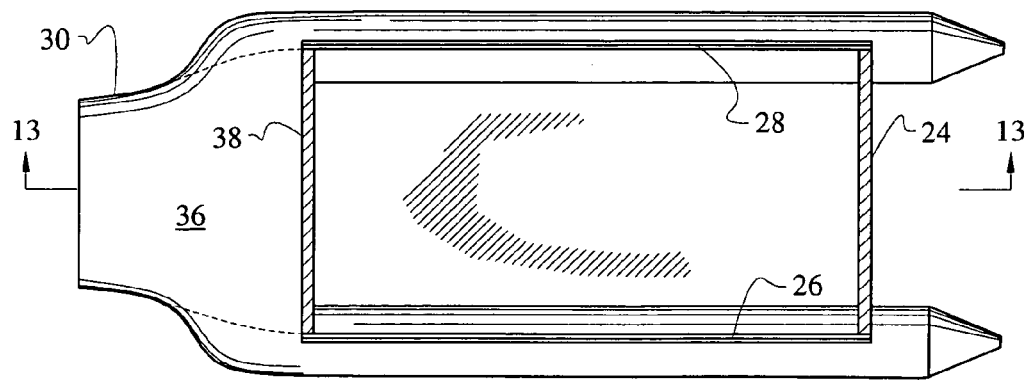
FIG. 11 is a top plan view of the dinghy depicted in FIG. 10.

FIG. 10 depicts air scoop 30 at the bow of dinghy 10a and FIG. 11 depicts how air passageway 36 extends from said air scoop to the leading end of air chamber 32. FIG. 11 further depicts constriction member 38 at the leading end of air chamber 32 and transom 24 that forms a barrier at the trailing end of said air chamber.

Figure 12:
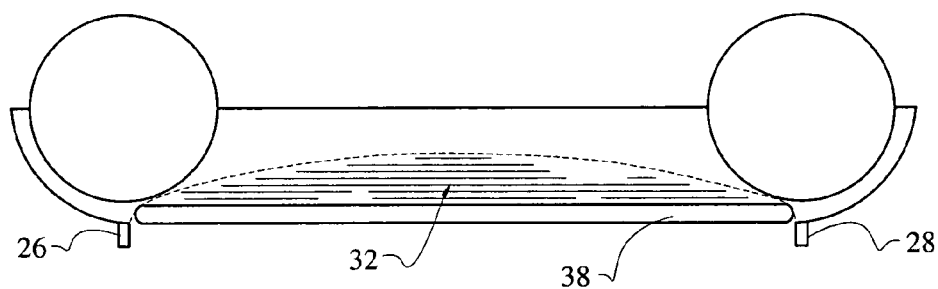
FIG. 12 is a transverse sectional view taken along line 12—12 in FIG. 10.
Figure 13:
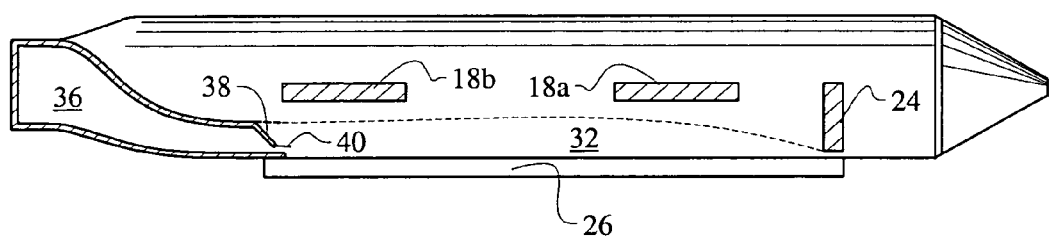
FIG. 13 is a longitudinal sectional view taken along line 13—13 in FIG. 11.

As is clear from FIG. 12, elongate rails 26, 28 may be added to virtually any watercraft. Dinghy 10*a* is depicted just to point out this important aspect of the invention. The effect of air chamber 32 is greater in a dinghy because, as pointed out in the incorporated disclosure, the flexible bottom of a dinghy makes it easy to form a large air chamber therein. In rigid hull watercraft, the best way to create an air chamber beneath the hull is to use rails such as rails 26, 28, as disclosed herein, to prevent air under the hull from escaping laterally.

The effect of air flowing through air chamber 32 is to reduce drag because the above water surfaces of air chamber 32 are contacted primarily by air flowing therepast, not primarily by water.

When a conventional watercraft is in operation, a pair of bow waves are formed that extend rearwardly from the watercraft in an inverted "V" shape, i.e., a first bow wave will form on the port side of the watercraft and a second bow wave will form on the starboard side. These bow waves include spray and thus are white-in-color, like the white-in-color water produced by a waterfall. At night, an unlit conventional watercraft may be hard to see but night vision goggles will enable a user to see the spray caused by the bow waves. An important effect of the novel design is to suppress bow waves. A watercraft that incorporates the teachings and suggestions of this disclosure is a stealthy watercraft to the extent that it operates at high speeds yet does not produces detectable bow waves, even if night vision goggles are used.

The stern wake, made up of white-in-color bubbles that are also detectable in darkness with the aid of night vision goggles, may also be suppressed to the point where it cannot be detected by such equipment. Motor 20 is moved away from the stern, toward the bow so that the white water created by the propellers is substantially bubble-free by the time it flows under the stern and becomes the stern wake. Empirical studies will suggest the ideal mounting for watercraft of differing lengths and speeds. A fast watercraft will require a long distance between the propellers and the stern to increase the dwell time of the bubbles under the hull so that the bubbles are gone or substantially gone by the time the stern of the watercraft passes over them. A shorter distance will be satisfactory for a watercraft that travels at slower speeds.

Accordingly, the combination of a mid or forward-mounted motor to suppress the stern wake, together with the novel structure disclosed herein to suppress bow waves, produces a watercraft that moves with a high degree of stealth at night even if night vision goggles are employed in an effort to see it.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A watercraft having reduced drag, comprising:
a bow, a hull, and a stern;
a pair of elongate rails that depend from opposite sides of said hull in substantially parallel relation to one another;
an air chamber defined at a top thereof by said hull, at its sides by said elongate rails, and at a bottom thereof by water within which said watercraft floats;
said air chamber being created only when said watercraft is underway, there being no air chamber when said watercraft is at rest;
an air scoop mounted to said bow;
an air passageway that interconnects said bow to said air chamber, said air passageway having a leading end in open communication with said bow and a trailing end in open communication with said air chamber;
said air chamber having a forward end near said bow and a rearward end forwardly of said stern so that air flows into said air chamber at said forward end and so that air flows out of said air chamber at said rearward end and under said stern as said watercraft undergoes forward travel;
a downwardly extending constriction member disposed at said trailing end of said air passageway, said constriction member forming a constriction that abruptly reduces a height of said air passageway;
a one-way flap hingedly mounted to a trailing end of said constriction member, said flap having a position of repose that closes said air passageway when the watercraft is at rest and said flap being at least partially opened by flow of air through said air passageway when said watercraft is in forward motion;
whereby flow of air from said air chamber to said bow is prevented by said flap; and
whereby the volume of said air chamber is greater than the volume of the air passageway at said constriction so that ambient air is drawn into said air scoop when the watercraft is in forward motion;
whereby said air in said air chamber reduces the drag of the watercraft, thereby enabling said watercraft to travel faster under its own power and reducing the power required to tow the watercraft behind a larger watercraft.

2. The watercraft of claim 1, further comprising:
said air scoop having a generally elliptical shape such that a transverse extent thereof is greater than a height extent thereof.

3. The watercraft of claim 1, further comprising:
said air chamber having a longitudinal extent that exceeds a transverse extent thereof.

\* \* \* \* \*